US012725411B2

(12) United States Patent
Hostache et al.

(10) Patent No.: US 12,725,411 B2
(45) Date of Patent: Sep. 1, 2026

(54) METHOD FOR QUANTIFYING THE EXTENT AND RECURRENCE OF NATURAL EVENTS

(71) Applicant: LUXEMBOURG INSTITUTE OF SCIENCE AND TECHNOLOGY (LIST), Esch/Alzette (LU)

(72) Inventors: Renaud Hostache, Esch/Alzette (LU); Marco Chini, Esch/Alzette (LU); Patrick Matgen, Esch/Alzette (LU); Marina Zingaro, Esch/Alzette (LU)

(73) Assignee: LUXEMBOURG INSTITUTE OF SCIENCE AND TECHNOLOGY (LIST), Esch/Alzette (LU)

( * ) Notice: Subject to any disclaimer, the term of this patent is extended or adjusted under 35 U.S.C. 154(b) by 391 days.

(21) Appl. No.: 18/257,621

(22) PCT Filed: Dec. 17, 2021

(86) PCT No.: PCT/EP2021/086647
§ 371 (c)(1),
(2) Date: Jun. 15, 2023

(87) PCT Pub. No.: WO2022/129611
PCT Pub. Date: Jun. 23, 2022

(65) Prior Publication Data

US 2024/0046639 A1 Feb. 8, 2024

(30) Foreign Application Priority Data

Dec. 18, 2020 (LU) .................................. LU102319

(51) Int. Cl.
*G06V 20/13* (2022.01)
*G01W 1/00* (2006.01)
(Continued)

(52) U.S. Cl.
CPC ............... *G06V 20/13* (2022.01); *G01W 1/00* (2013.01); *G01W 1/10* (2013.01);
(Continued)

(58) Field of Classification Search
CPC ......... G06V 20/13; G06V 10/25; G01W 1/00; G01W 2201/00; G01W 1/10; G06Q 50/16; G06Q 10/047
See application file for complete search history.

(56) References Cited

U.S. PATENT DOCUMENTS

2005/0222829 A1* 10/2005 Dumas ................... G06Q 10/02 703/2
2016/0239750 A1* 8/2016 Haas ...................... G06Q 50/16
(Continued)

FOREIGN PATENT DOCUMENTS

| | | | | | |
|---|---|---|---|---|---|
| CN | 107563455 A | * | 1/2018 | | |
| CN | 107729695 A | * | 2/2018 | ............. | G06F 30/20 |
| JP | 2018092467 A | * | 6/2018 | | |

OTHER PUBLICATIONS

International Search Reported from Corresponding International Application No. PCT/EP2021/086647, dated Apr. 12, 2022, 4 pages.

*Primary Examiner* — Christian T Bryant
(74) *Attorney, Agent, or Firm* — RANKIN, HILL & CLARK LLP

(57) ABSTRACT

A method for quantifying the extent and recurrence of a predetermined natural event, such as a flooding event, in a geographical area, in particular in spite of the absence of reliable data from sensors on the ground where the natural event develops. The method relies on remote sensing data, such as satellite imagery, and data processing, and reaps the benefits of computational models based on accurate remote sensing of the area under consideration.

12 Claims, 2 Drawing Sheets

(51) Int. Cl.

| | |
|---|---|
| ***G01W 1/10*** | (2006.01) |
| ***G06Q 10/047*** | (2023.01) |
| ***G06Q 50/16*** | (2024.01) |
| ***G06V 10/25*** | (2022.01) |

(52) U.S. Cl.

CPC ....... *G01W 2201/00* (2013.01); *G06Q 10/047* (2013.01); *G06Q 50/16* (2013.01); *G06V 10/25* (2022.01)

(56) References Cited

U.S. PATENT DOCUMENTS

| | | | | |
|---|---|---|---|---|
| 2017/0083747 | A1 | 3/2017 | Guan et al. | |
| 2019/0316309 | A1* | 10/2019 | Wani | G06F 3/0484 |
| 2019/0318440 | A1* | 10/2019 | Wani | G06Q 50/265 |

* cited by examiner

100

102

T1

Ti-1

Ti

Ti+1

T N

104

108 w (k, i)

106

110

W i, i ⊂ [1; N]

112

$\hat{T} = \Sigma$ Ti*Wi

114

Tj < $\hat{T}$ < Tj+1

116

METHOD FOR QUANTIFYING THE EXTENT AND RECURRENCE OF NATURAL EVENTS

TECHNICAL FIELD

The invention refers to earth event observation and data processing. The invention also pertains to earth disaster observation, analysis and modelling.

BACKGROUND OF THE INVENTION

Natural disasters occur at different frequencies depending on the kind of disaster and on the location where they occur. Natural disasters cause casualties, damages to infrastructures, buildings and crops, and block human activity. They also generate hazardous situations and require mitigation and repairing actions. In order to cope with these events, safety measures and rescue solutions need to be deployed quickly. Depending on the event magnitude, it may be safer to leave the impacted area.

In order to assess risks, it is necessary to provide maps illustrating the different danger levels at each location. However, the available maps are generally of limited accuracy. Accordingly, the return period and the frequency are not computed with a satisfying accuracy. The dangers are not properly identified.

Computing a return period may be executed in relation with an observed event, in a specific area of interest. Traditionally, accurate measurement of a natural event such as a flooding event is only available using in-situ ground-based sensors deployed in an area of interest. If sensing data is not available, inaccurate or inaccessible, it is difficult to obtain measurements of the physical impact of a natural event. However, such measurement data is necessary for quantifying the extend and possible the recurrence of such an event. In some instances, the data require an update when infrastructures have changed the area behaviour with respect to said kind of event. For instance, new infrastructure may block water flows, thereby impacting behaviour with respect to flooding event. Other infrastructure may locally impact temperatures, or wind speeds.

Technical Problem to be Solved

It is an objective of the invention to present a process, which overcomes at least some of the disadvantages of the prior art.

SUMMARY OF THE INVENTION

In accordance with a first aspect of the invention, a method for quantifying the extent and recurrence of a predetermined natural event in a geographical area is provided. The method comprises the steps of:

- providing, in a first memory element, a first probability data set associated with a plurality of locations in said geographical area, indicating probabilities of each location being affected by said predetermined event based on remote sensing data;
- providing, in a second memory element, a plurality of second probability data sets associated with the same locations, wherein each second probability data set is associated with a recurrence period or frequency of said predetermined natural event, and wherein each data set indicates probabilities of each location being affected at a corresponding recurrence by said predetermined event based on computer simulation results;
- using computing means, computing for each of said locations a set of weights, wherein each weight indicates a similarity between the probability associated with said location in the first probability data set, and in one of the second probability data sets respectively;
- using computing means, computing, for each of said locations and using the corresponding set of weights,
- a weighted combination of the probability data associated with the location in each of said second probability data sets,
- a weighted combination of the corresponding recurrence periods or frequencies, and storing the results in a third memory element,
- thereby generating data indicative of the extent and recurrence of said predetermined natural event for each location in said geographical area.

Preferably, the predetermined natural event may comprise a flooding event, and the first and second probability data sets may indicate probabilities that each location is covered by water.

The step of providing a first probability data set may preferably comprise the steps of

- obtaining remote sensing data representing said geographical area;
- using image processing means, detecting representations of said predetermined natural event in said remote sensing data, and
- associating a probability of detection of a representation of said predetermined natural event to locations represented by said remote sensing data.

Preferably, each of the plurality of locations is represented by one pixel of said remote sensing data.

Preferably, at least one of the locations may be represented by a sub-area comprising a plurality of pixels in said remote sensing data.

The boundaries of at least one of the sub-areas may preferably be determined using image processing means by the detection of a watershed area in a dataset describing said geographical area.

Preferably, the dataset describing said geographical area may comprise topographical data.

Preferably, the dataset describing said geographical area may comprise said remote sensing data.

Preferably, the step of computing a set of weights for each of the locations may comprise the computation of weights for sub-areas, wherein the weights computed for each probability data or pixel in the sub-area are aggregated into weights for the sub-areas.

The first and second probability data sets may preferably be characterized by the same spatial resolution.

Preferably, said remote sensing data may comprise synthetic aperture radar data or an electro-optical image.

The probabilities comprised in each of the second probability data sets may preferably be either 0 or 1.

It may further be preferred that the weighted combination comprises a weighted average.

Preferably, the method may comprise the step of combining, using image processing means, the remote sensing data for each location in said geographical area with the generated data indicative of the extent and recurrence of said predetermined natural event for each location in said geographical area, to generate a map.

In accordance with another aspect of the invention, a computing device comprising a data processor and at least one memory element is provided. The data processor is configured to carry out the method according to aspects of the invention.

In accordance with yet another aspect of the invention, a computer program comprising computer readable code means is provided, which, when run on a computer, causes the computer to carry out the method according to aspects of the invention.

In accordance with another aspect of the invention, a computer program product including a computer-readable medium is provided, on which the computer program according to aspects of the invention stored.

According to an aspect of the invention, it is provided a process for assessing recurrence data of an observed event, the process comprising the steps: obtaining an image of the observed event, said image comprising first pixels with first probabilities relating to said observed event; obtaining simulation maps associated with said observed event, said simulation maps comprising projected recurrence data and second pixels with second probabilities; computing time related comparison weights with the first probabilities and the second probabilities; said comparison weights being associated with the simulation maps; computing, with computing means, the recurrence data of the observed event depending on a combination of the projected recurrence data and the time related comparison weights.

Preferably, the observed event is a natural event such as an observed meteorological event, or an observed pollution event.

Preferably, the observed natural event is an observed flooding event, the first probabilities are first water probabilities, the second probabilities are second water probabilities, and the recurrence data are flooding recurrence data.

Preferably, the observed natural event is an observed windstorm event, or an observed frost event, or an observed snowfall event, or an observed rainfall event, or an observed drought event.

Preferably, the process further comprises a step of generating a combination map, by means of at least two simulation maps whose associated recurrence data are the closest to the projected recurrence data, the process optionally further comprising a step of displaying the combination map.

Preferably, the process further comprises a step of selecting, amongst the simulation maps, the simulation map whose projected recurrence data are the closest to the recurrence data of the observed event, the process optionally further comprising a step of displaying the selected simulation map.

Preferably, the process further comprises a step of defining a plurality of geographical zones; and/or the step of computing comparison weights comprises the sub step of computing time related zone weights.

Preferably, the step of defining the plurality of geographical zones comprises a sub step of defining the size of the geographical zones depending on a feature of the observed event of the image.

Preferably, the zone weights comprise an aggregation of coherence weights; the step of computing comparison weights comprises the sub step of computing said coherence weights which are configured for combining the first probabilities and the second probabilities associated with the observed event, and/or the first probabilities and the second probabilities associated to absence of the observed event, and at the step of computing the recurrence data, said recurrence data is computed for: at least one, or each, or the geographical zone(s); optionally independently from one another, or independently from each other.

Preferably, the geographical zones comprise watershed areas.

Preferably, at the step of generating the combination map the geographical zones of different simulations maps are selected depending on the associated zone weights.

Preferably, the process further comprises a step of aligning the first pixels and the second pixels of at least one of the simulation maps, the first pixels of the flooding image comprise a first pixel density; the second pixels of the flooding simulation maps comprise a second pixel density which is equal to the first pixel density.

Preferably, the process further comprises a step of computing an intermediate image by combining adjacent first pixels, and computing intermediate simulation maps by combining adjacent second pixels; at the step of computing time related comparison weights; intermediate weights are computed; and at step computing the recurrence data, the intermediate weights are combined with the projected recurrence data.

Preferably, the recurrence data are computed independently from one another for the intermediate weights; and/or the intermediate weights are combined in order to provide independent recurrence data, for each, or the intermediate weights.

Preferably, the projected recurrence data comprises time intervals between subsequent simulation maps, said time intervals increasing with duration of projections.

Preferably, the projected recurrence data comprises time durations with a monotonous increase, the second probabilities increasing with said monotonous increase of the time durations.

Preferably, the projected recurrence data comprises projected return periods, and the recurrence data comprises a return period; or the projected recurrence data comprise projected frequencies; and the recurrence data comprise an event frequency.

Preferably, the combination comprises a weighted sum of the projected recurrence data and the comparison weights, preferably each comparison weight is associated with one of the projected return periods.

Preferably, the image and/or the simulation maps comprise(s) a river and preferably at least one tributary, the number of second pixels defining the rivers varying with the projected recurrence data, preferably the second probabilities increasing with time durations of the projected recurrence data.

Preferably, the projected recurrence data comprises projected return periods of at least 2 years.

Preferably, the projected recurrence data comprises projected return periods of at least 100 years.

Preferably, the step of obtaining simulation maps is executed before step obtaining the image.

Preferably, at the step of obtaining the image, said image is a synthetic aperture radar image or an electro-optical image.

Preferably, the second probabilities are 0 or 1, and the first probabilities range from 0 to 1.

Preferably, the second probabilities range from 0 to 1, and the first water probabilities range from 0 to 1.

Preferably, the second probabilities are 0 or 1, and the first probabilities are 0 or 1.

Preferably, the step of obtaining the image is executed on first computing means, the step of obtaining the flooding simulation maps is executed on second computing means, optionally the step of computing the comparison weights is executed on third computing means.

Preferably, the observed event may be an observed natural disaster event.

Preferably, the observed event may comprise a freezing observed event, such as a blizzard observed event, or a hailstorm observed event, or an ice storm event.

Preferably, the observed event may be an observed hydrological event.

Preferably, the observed event may be an observed geological observed event.

Preferably, the observed event may be an observed meteorological event.

Preferably, the observed event may be an observed wildfire event.

Preferably, the observed pollution event may be an observed air pollution event or an observed soil pollution event, or an observed water pollution event.

Preferably, the flooding return period may be between the observed flooding event and an equivalent projected flooding event.

Preferably, the process may comprise computing differences between the recurrence data and the theorical recurrence data of the simulation maps, a step selecting a simulation map from the simulation maps with the smallest differences with the computed recurrence data.

Preferably, the geographical zones may comprise elevation data, preferably elevation data variations.

Preferably, the process may further comprise a step computing an intermediate flooding image, and computing intermediate flooding simulation maps.

Preferably, at step computing the intermediate image, intermediate first pixels are defined by combining the first probabilities of the corresponding adjacent first pixels, and/or intermediate second pixels are defined by combining second probabilities of the corresponding adjacent second pixels of one of the simulation maps.

Preferably, the simulation maps comprise a simulation map for each year within a first time period, said time period preferably being of at least 10 years, more preferably of at least 20 years.

Preferably, the projected recurrence data comprises a flooding projection maps on at least: 50 years, or on 500 year Preferably, the geographical zones are defined in relation with inclination data.

Preferably, the comparison weights are associated with one point or surface or location, of the observed event.

Preferably, the comparison weights, associated with one of the simulation maps, are configured for increasing when the first probabilities locally correspond to the associated of the second probabilities of said one of the simulation maps.

Preferably, the first probabilities are first water probabilities or first flooding probabilities.

Preferably, the second probabilities are second water probabilities or second flooding probabilities.

It is another aspect of the invention to provide a process for assessing flooding recurrence data, such as the return period or the frequency, of an observed flooding event, the assessing process comprising the steps: obtaining a flooding image of the observed flooding event, said flooding image comprising first pixels with first water probabilities; obtaining flooding simulation maps comprising projected recurrence data and second pixels with second water probabilities; computing time related comparison weights with the first water probabilities and the second water probabilities; said comparison weights being associated with the flooding simulation maps; computing, with computing means, the flooding recurrence data of the observed flooding event depending on a combination of the projected recurrence data and the comparison weights.

It is another aspect of the invention to provide a computer program comprising computer readable code means, which when run on a computer, cause the computer to carry out the process according to the invention.

It is another aspect of the invention to provide a computer program product including a computer readable medium on which the computer program according to the invention.

It is another aspect of the invention to provide a computer configured for carrying out the process according to the invention.

The different aspects of the invention may be combined to each other. In addition, the preferable features of each aspect of the invention may be combined with the other aspects of the invention, unless the contrary is explicitly mentioned.

The proposed use of simulation data, combined through data processing with remote sensing data as captured for example by an earth observation satellite, allows to measure the extent of natural events occurring on Earth, even in situations where no sensors are or can be installed on the ground, where the event unfolds.

The combination of the projected recurrence data and comparison weights offers a reliable solution for determining extent and recurrence data since the comparison weights allows to favour simulation data which closely matches the observed situation as depicted by the remote sensing data. In addition, the invention offers trustworthy results; even on long scale studies, namely for projections of at least: 50 years, or one century.

Subdividing the images and the simulation maps enables to focus on specific sub zones of interest, and to apply dedicated mathematical formulae with parameters reducing the importance of improbable data. Thereby, the data indicating the extend and recurrence of an unfolding natural event becomes more relevant, more reliable. The sub zones may be tailored in order to present similar probabilities, thereby reducing the computing efforts.

According to another effect of the invention, the process quickly provides an assessment of the observed event, also with sparse available data. The invention also conforms to different qualities of obtained images.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes the invention in further detail based on preferred embodiments and on the figures. Similar reference numbers will be used to describe similar or the same concepts throughout different embodiments of the invention.

It should be noted that features described for a specific embodiment described herein may be combined with the features of other embodiments unless the contrary is explicitly mentioned. Features commonly known in the art will not be explicitly mentioned for the sake of focusing on the features that are specific to the invention.

Some features, notably ranges, are defined with values 0 and 1. It is understood that in the scope of the invention, these values may be replaced by: 0.01 and 0.99 respectively, or 0.0001 and 0.9999 respectively. The invention also covers slight variations of these integer values—for instance of a few percent points—notably in order to provide a process which is more inclusive.

Figure 1:
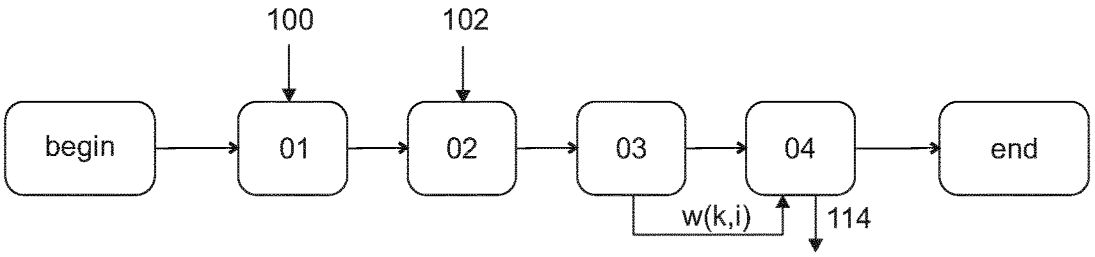
FIG. 1 provides a workflow indicating the main steps of a method in accordance with a preferred embodiment of the invention.

FIG. 1 illustrates the main steps of a preferred embodiment in accordance with the invention. In a first step 01, a first probability data set 100 associated with a plurality of locations in said geographical area is provided in a first memory element to which a data processor has read access.

In the context of the invention, a data processor may be a purpose-build processing device, or a general-purpose central processing unit, CPU, which is configured to perform the described steps through appropriately formulated software code. The memory element may be a Hard Disk Drive, HDD, a Solid-State Drive, SSD, a volatile memory element or any known storage device. The first probability data set indicates probabilities of each location being affected by said predetermined event based on remote sensing data. By way of a non-limiting example, if the predetermined event is a flooding event, the data set will provide, for each represented location, the probability that the remote sensing data shows a location that is covered with water. Methods for determining such probabilities, based for example on synthetic aperture radar images, are known in the art, and will not be described to any detail in the context of the present invention. The remote sensing data may be obtained in real-time through a communication channel, such as a satellite link. Preferably, each of the plurality of locations is represented by one pixel of said remote sensing data. Alternatively, at least one of the locations may be represented by a sub-area comprising a plurality of pixels in said remote sensing data.

In a second step 02 a plurality of second probability data sets 102 are provided in a second memory element. Each data sets are associated with the same locations that are referenced by the first data set. The second memory may share the same physical device than the first memory element. Each second probability data set is further associated with a recurrence period or frequency (T1, . . . , Ti, . . . , TN) of said predetermined natural event. Further, each second data set indicates probabilities of each location being affected at a corresponding recurrence by said predetermined event based on computer simulation results. The computer simulations may be computed off-line in advance of the observation of the event being made available in step 01. The simulation may further be obtained using either one, or a plurality of available flooding simulation models as known in the art.

At step 03, an appropriately configured data processor implementing computing means computes, for each of said locations (indexed by the letter i), a set of weights, each weight being expressed as w(k, i). The processor implements a computation loop, wherein the loop is defined over the plurality of locations. Each weight indicates a similarity between the probability associated with the location (i, which is under consideration in the current instance of the loop) in the first probability data set 100, and in one (k) of the second probability data sets 102 respectively. The number of weights for each location is in the end equal to the number of second probability data sets.

At step 04, for each of said locations and using the corresponding set of weights, a weighted combination, for example a weighted average, of the probability data, associated with the location in each of said second probability data sets is computed. This results in generating data indicative of the extent of said predetermined natural event for each location in said geographical area.

Further, a weighted combination of the corresponding recurrence periods or frequencies is computed, which indicates of the estimated recurrence of an event of the observed for each location in said geographical area.

The resulting data 114, which is available for all locations that are represented in the remote sensing data, may for example be used as an overlay map that highlights flooding extent and estimated recurrence periods or frequencies per location. Higher probabilities in the resulting extent data may be provided in red in such an overlay, in order to direct the attention of an observer's visual system immediately to areas where action is required. Such an overlay map is stored in a memory element and may preferably be displayed on a computer display.

The generated data 114 may further be added to the plurality of second probability data sets. This allows future observations to be matched to earlier processed combined simulation/observation data, in order to increase the accuracy of the generated measurement data.

Further preferred embodiments and preferred features of the main method steps will be described in the following.

Figure 2:
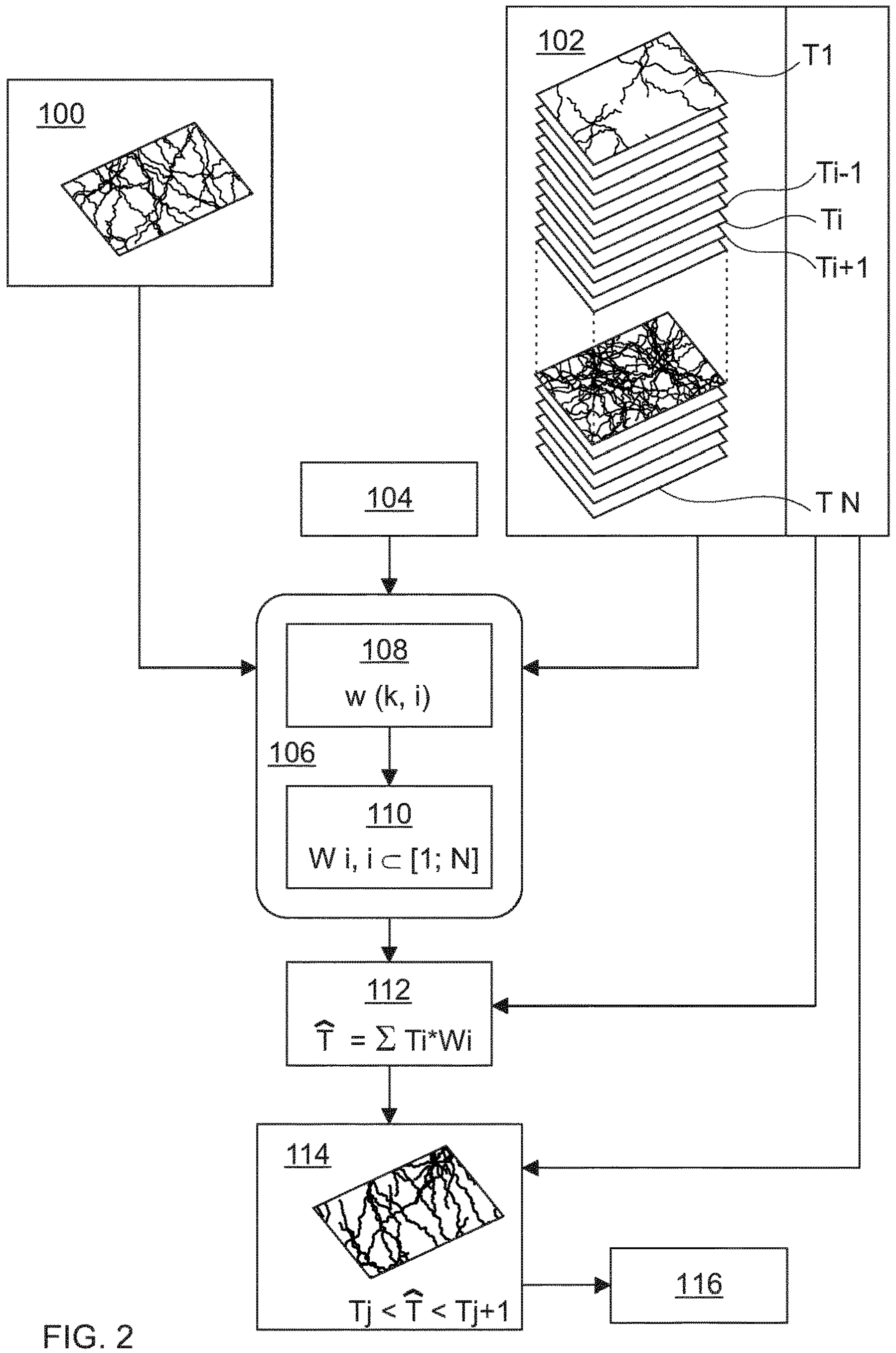
FIG. 2 provides a schematic illustration of a method in accordance with a preferred embodiment of the invention.
Figure 3:
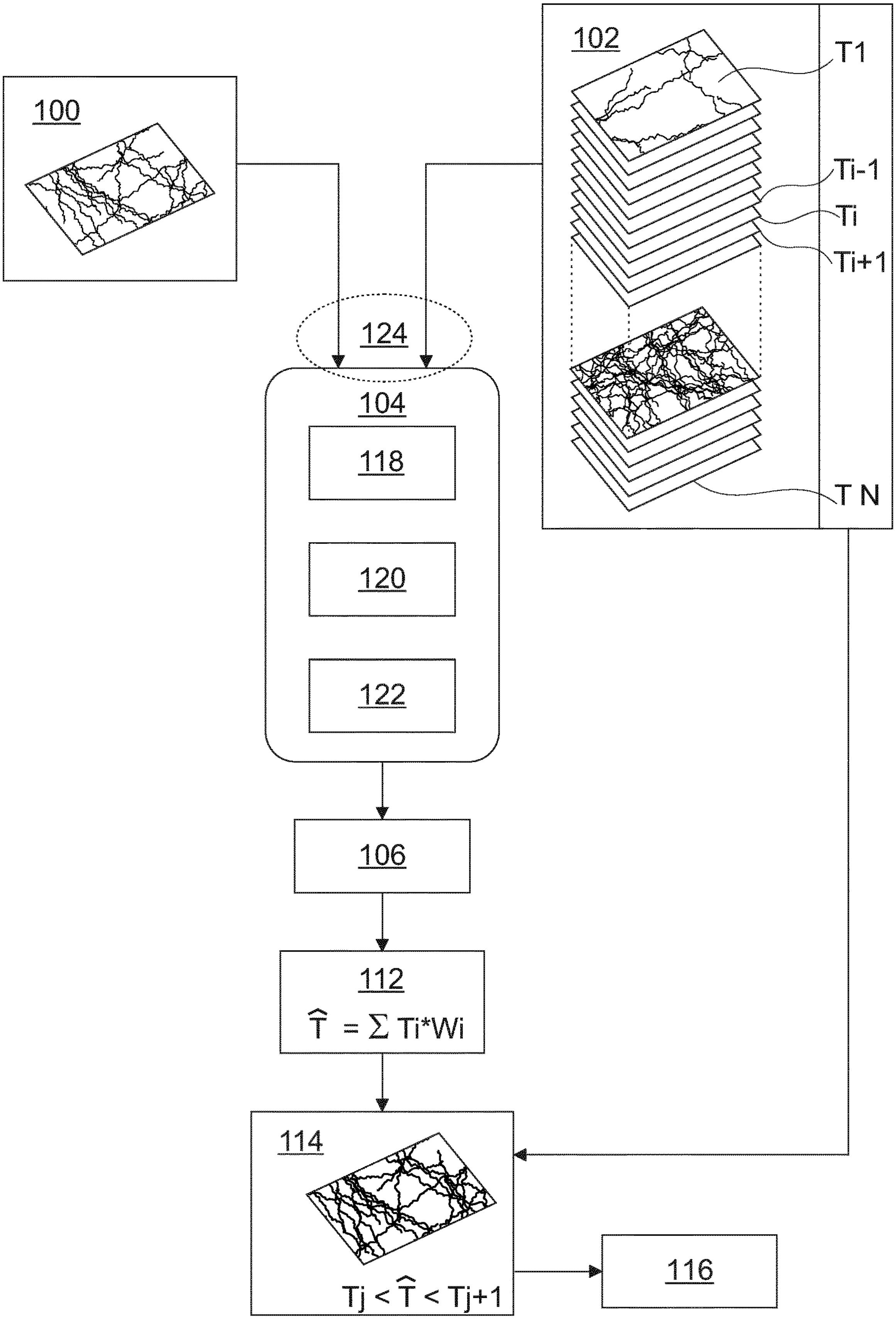
FIG. 3 provides a schematic illustration of a method in accordance with a preferred embodiment of the invention.

FIG. 2 shows an illustration of a process in accordance with a preferred embodiment of the invention.

The process is for example useful for assessing the return period of an observed event, or the frequency of said observed event. The time scale of the invention is somewhat a long timescale.

The invention applies to events with recurrence periods of at least: 2 years, or 5 years, or 10 years, or 20 years, or 50 years, or 100 years, or 200 years, or 500 years, or 1000 years.

The process in accordance with the illustrated embodiment for assessing the recurrence data comprises the following steps, optionally executed in the sequence as listed below:

- providing 100 an image of the observed event, said image comprising first pixels with first probabilities of presence of the observed event; this corresponds to step 01 in FIG. 1.
- providing 102 simulation maps comprising projected recurrence data Ti and second pixels with second event related probabilities; this corresponds to step 02 in FIG. 1.
- defining 104 a plurality of geographical zones within the image and in the simulation maps;
- computing 106 time related comparison weights by means of the first probabilities and the second probabilities; said comparison weights being associated with the simulation maps; this corresponds to step 03 in FIG. 1. The step of computing 106 the time related comparison weights, comprises the sub steps:
  - computing 108 coherence weights, and
  - computing 110 zone weights;
- computing 112 the recurrence data $\hat{T}$ of the observed event depending on a combination of the projected recurrence data Ti and the comparison weights;
- generating 114 a combination map; these steps correspond to step 04 in FIG. 1.
- displaying 116 the combination map.

The observed event may be of different categories. It may be a nature triggered event, or a human triggered event. As an option, the observed event may have natural and human origins. The observed event may be an observed natural event such as a meteorological event, and/or an observed pollution event.

The pollution event may be an atmosphere pollution event. In such events, the content of pollution particles may exhibit an increase. The increase may be correlated to human activities, or a wildfire.

The increase of the air pollution level may be promoted by an absence of wind. Thus, it may be understood that human events and nature events are interdependent, and correlated.

As an alternative, the observed pollution event may be an observed soil pollution event, or an observed water pollution event.

The observed meteorological event may be an observed flooding event. During a duration, rainfalls may be important. The maximum runoff feature of the area of interest may be reached, such that water accumulates and spreads on soil surfaces, also considered flooding free surfaces. The water surfaces spread. As a further parameter to consider, the history of the recent rainfalls may be considered. Indeed, a dry soil presents a limited water absorption. The area may comprise at least one water absorption feature, with a water absorption variation(s). Thus, when an important rainfall occurs after a long dry period, the risk of flooding increases. The probabilities discussed below may be combined probabilities.

As an alternative or in addition, the observed meteorological event may comprise an observed windstorm event, or an observed frost event, or an observed snowfall event, or an observed rainfall event, or an observed drought event, or an observed tsunami event, or an observed earthquake event.

The observed event may be an observed natural disaster event, notably in an area of interest. The observed natural disaster event may be a freezing observed event, such as a blizzard observed event, or a hailstorm observed event, or an ice storm event.

The observed natural disaster event may be an observed hydrological event, or an observed geological observed event, or an observed wildfire event. The wildfire events may be of varying extent depending on the history of previous wildfire events.

The invention considers combination of the above event listed above.

At the step of obtaining the first data set 100, for example in the form of an image, the first pixels form an array of pixels with a first pixel density. Each first pixel comprises at least one value. The first probabilities correspond to the probabilities that one of the first pixels features or represents the observed event. The first probabilities may range from 0 to 1. This probability may be influenced by the technical means which are used in order to acquire the image. The image may be an aerial image. It may be derived from a satellite image. The satellite image may rely on the synthetic aperture radar (SAR) technique or on the electro-optical (EO) technique. The SAR technology provides accurate results, and offers a high resolution even under bad meteorological conditions.

At the step of obtaining the second data sets 102, for example in the form of simulation maps, these may correspond, at least partially, to the area covered by the image. The covered area may measure at least: 10 $km^2$, or 100 $km^2$. The simulation maps may be at the same scale than the image. They may have the same orientations and the same surface. The second pixels comprise a second pixel density which is equal to the first pixel density, thereby easing the comparison of the pixels, one by one where applies. Further computation routines may be executed for this purpose.

The step of obtaining the second data sets or simulation maps 102 may be executed by means of simulation of a mathematical model using elevation data. Liquid and gas flow simulation hardware may be used as well. The simulation maps may be computed by means of thermal pictures, such as infrared pictures. Texture data and material data may be used.

As an option, the step of obtaining the simulation maps is executed before step obtaining the observed image 100. Thus, this anticipation provides an estimate of the recurrence data $\hat{T}$ at an earlier stage. When safety measures are adopted depending on the findings, safety is improved.

As described in the context of FIG. 1, the probability values in each of the second data sets correspond to the locations to which the probability values in the first data set refer. Therefore, each second pixel, representing a probability value from one of the second data sets, may be associated with one of the first pixels representing a probability value in the first data set. At the step of obtaining the second probability data sets, or equivalently, simulation maps, the second probabilities may be defined such that one of the second pixels of one of the simulation maps presents a feature corresponding to the observed event. By way of illustration, the second probabilities may be water probabilities: the probability that one of the second pixels is a water pixel. In order to save computation resource, the second probabilities may be 0 or 1. Integer values are therefore selected.

As an alternative increasing accuracy, the second probabilities may range from 0 to 1.

The step of obtaining the simulation maps comprises several simulation maps. The simulation maps are associated with projected recurrence data. By way of illustration, each simulation map comprises a return period Ti, wherein the indicia "i" varies from 1 to N, where "N" is the number of considered simulation maps (a year number of at least: 20, or 100, or 500, by way of illustration). The set of simulation maps may comprise a simulation map for each future year: from year T0+1 to at least year T0+15; or from year T0+1 to year T0+50; or from year T0+1 to year T0+200; or from year T0+1 to year T0+500. The invention provides accurate results for long term assessment of the recurrence data. The invention provides meaningful results on projections of several centuries. In the above definition, TO may correspond to the time point at which the event is observed, and/or the time point at which the step obtaining 102 is executed.

As an alternative, the set of simulation maps may comprise a simulation map for each year in a first time period, and a simulation map for one year out of two in a second time period which is after the first time period. By way of illustration, the simulation map set may comprise a map for each year from T0+1 to T0+25, and one simulation map on every two years between T0+50 and T0+99; and one simulation map on every five years between T0+100 and T0+500. Thus, less computation resources are required during the step of computing 112 the recurrence data $\hat{T}$, as will be understood later on.

The projected recurrence data may comprise time durations Ti with a monotonous increase. The second probabilities may increase with said monotonous increase of the time durations. Then, the variation of the second probabilities follows the variation of time. The weights computed with these second probabilities are more accurate.

The image (first probability data set) and/or the simulation maps (second probability data sets) may comprise(s) data associated with locations including a river and preferably at least one tributary, the number of second pixels defining the rivers varying with the projected recurrence data, preferably the second probabilities increasing with time durations of the projected recurrence data.

The step of defining 104 the plurality of geographical zones comprises definitions of geographical zones covered by the image. The step of defining 104 may comprise dividing the image and the simulation maps into different sub-images, or tiles. Each sub image of the image finds a counterpart in each of the simulated maps. The sub-images or tiles may be defined in relation with watersheds of the whole image. Topological data may be used. The geographical zones may be defined by their slopes. Thus, the geographical data may be of different shapes, and with irregular outlines. At step of computing 106 comparison weights, the latter comprise time related zone weights for said geographical zones. Thus, the weights exhibit a general coherence. The process offers a clearer distinction between the pixels related to the observed event, and those which are not.

The sub-step computing 108 coherence weights w(k,i) comprise probability sums. At least one, or each, or the coherence weight w(k,i) may be a local weight. The local weight indicates the similarity between the probability associated with the location depicted by pixel k in the first data set 100, and the probability associated with the same location in the $i^{th}$ second data set/simulation map 102. A local weight may be computed for each simulation map, and for each first pixel. At least one, or each, or the coherence weight comprises at least one product of one of the first probabilities $p_k(wa|\sigma^0)$ and one of the second probabilities $\theta_{(k,\ i)}$. In the context of a SAR image of flooding event, $p_k(wa|\sigma^0)$ corresponds to the probability that k-th first pixels is flooded depending on a measured backscatter value $\sigma^0$ of the corresponding first pixel. The coherence weights w(k,i) are configured for combining the first (i.e. stemming from the first probability data set) probabilities $p_k(wa|\sigma^0)$ and the second (i.e. stemming from the $i^{th}$ second probability data set) probabilities $\theta_{(k,\ i)}$ associated with the observed event, and the first probabilities $p_k(wa|\sigma^0)$ and the second probabilities $\theta_{(k,\ i)}$ associated of absence of the observed event. The coherence weights w(k,i) may be computed by the following equation:

$$w(k,i)=p_k(wa|\sigma^0)*\theta_{(k,i)}+(1-p_k(wa|\sigma^0))*(1-\theta_{(k,i)}) \quad \text{(equation 1)}$$

The equation 1 may be written in different forms and other similarity measure may be used without departing from the scope of the present invention. The above one underlines the coherence aspect between one of the first pixels, and the associated second pixels; in presence or absence of said event at the considered first pixel.

The sub-step computing 110 zone weights $W_i$ for a given sub-area comprising a plurality of pixels representing locations, may comprise at least one combination of coherence weights w (k, i) of the constituent pixels. The zone weights $W_i$ may comprise an aggregation of coherence weights. The weights $W_i$ may comprise products of coherence weights w (k, i).

The zone weights $W_i$ may be ascertained by the following equation:

$$Wi = \frac{\prod_{k=1}^{K} w(k, i)}{\sum_{i=1}^{N}\left(\prod_{k=1}^{K} w(k, i)\right)} \quad \text{(equation 2)}$$

The coherence weights w(k,i) and the zone weights $W_i$ may be considered as intermediate weights. They may be time related weights. A time related weight is considered as such as it is defined for different time points.

At the step of computing 112 the recurrence data, said recurrence data may comprise time projections. The recurrence data $\hat{T}$ may depend on projected return periods Ti; such as a flooding return periods. The flooding return period of the observed event is the most likely duration until the same, or essentially similar, flooding event occurs in the future.

At the step of computing 112 the reference data $\hat{T}$, the combination comprises a weighted sum of the projected recurrence data and the comparison weights, preferably each comparison weight is associated with one of the projected return periods. At step computing 112 the recurrence data, the return period $\hat{T}$ may be obtained by means of the following equation:

$$\hat{T} = \sum_{i=1}^{N} Wi * Ti \quad \text{(equation 3)}$$

For finer grained estimations, the weights w(k,i) for each location depicted in the remote sensing data (i.e. the first probability data set) may be used.

As an alternative, the projected recurrence data comprise projected frequencies; and the recurrence data comprise an event frequency. The frequency $\hat{F}$ of the event may be deduced as being the inverse of the return period $\hat{T}$. Then, the event frequency $\hat{F}$ may be computed as follows:

$$\hat{F} = \frac{1}{\hat{T}} \quad \text{(equation 4)}$$

wherein each simulation map is associated with one event frequency Fi (not represented). As an option, recurrence data are computed for the whole image.

As an alternative, recurrence data are computed for each or a collection of geographical zones, independently from each other. Thus, the geographical zones may comprise different recurrence data, for instance zone recurrence data or sub recurrence data. As an option, the recurrence data associated with each geographical zone is computed by means of equation 3, depending on its zone weight Wi. Recurrence data may be computed only for a portion of the image, optionally a portion of the observed event.

The process further comprises a step of generating 114 a combined map, by means of at least two simulation maps whose associated recurrence data Ti are the closest to the projected recurrence data Ti. The recurrence data $\hat{T}$ obtained at step of computing 112 the recurrence data is between two subsequent return period Tj and Tj+1; or Tj and Tj+k when there is a time gap variation between subsequent simulation maps. Then, the indicia "k" may be an integer which is of at least: 2, or 3, or 5, or 10.

The step of generating 114 may combine two simulation maps in their entirety.

Generally, the combined map 114 is a weighted combination, such as a weighted average of all the available simulation maps (i.e., second probability data sets), using the computed local or sub-area weights. As an alternative, the step of generating may combine different geographical zones of at least two different simulation maps. The geographical zones may be selected independently from each other. The geographical zones may be computed in accordance of their respective recurrence data As an option, the step of obtaining the first probability data set or image 100 of the observed event is executed with first computing means, the step of obtaining the second probability data sets or simulation 102 maps is executed with second computing means. As an option, the step of computing 106 the comparison weights is executed on third computing means. The step of computing 112 the recurrence data may be executed by means of fourth computing means. The process may be executed on different computers, at different locations, and at different times. The process may be executed with distributed computing means. Each step may be executed on a processor, or on different processors. Each step may be executed on a single computer system, or on different computer system, preferably connected by means of a network, such as a local network. Other networks are considered.

The invention provides a computer program product. The computer program product may include a computer readable medium on which the computer program according to the invention is stored. The computer program product may be data storage means. It may be a hard disk, a floppy disk, or a flash memory.

FIG. 4 shows an illustration of a method in accordance with a preferred embodiment of the invention.

The process for assessing recurrence data comprises the following steps, optionally executed in the sequence as listed below:

- providing, for example by obtaining second probability data sets or simulation maps 102 comprising projected recurrence data and second pixels with second probabilities; this is in line with step 02 in FIG. 1.
- providing, for example by obtaining a first probability data set or image 100 of the observed event, said image comprising first pixels with first probabilities; this corresponds to step 01 in FIG. 1.
- optionally defining 104 a plurality of geographical zones;
- computing 106 comparison weights w(k,i), optionally time related comparison weights, with the first probabilities and the second probabilities; said comparison weights being associated with the simulation maps; this corresponds to step 03 in FIG. 1.
- computing 112, with computing means, the recurrence data of the observed event depending on a combination of the projected recurrence data and the comparison weights.
- optionally generating 114 a map, or selecting a selected map; this corresponds to step 4 in FIG. 1.
- optionally displaying 116 the selected map.

The step of obtaining the first probability data set or image 100 may be a step of obtaining a first picture, and the step of obtaining the second probability data sets or simulation maps 102 may be a step of obtaining second pictures.

The step of defining 104 the plurality of geographical zones may comprise dividing the image and the simulation maps. The image and the simulation maps are divided in accordance with a same pattern. As an alternative, the geographical zones may be divided in sub-images or tiles corresponding to sub-areas of the depicted geographical area. The geographical zones may be obtained by means of a rectangular window of fixed sized, also designated as sliding-windows. The sub-images, for instance of the image or of any simulation map, may be adjacent, or overlapping.

The step of defining 104 a plurality of geographical zones may comprise a step of computing 118 an intermediate image by combining adjacent first pixels, and computing 120 intermediate simulation maps by combining adjacent second pixels. Each intermediate simulation map may be associated with one simulation map. A matrix may be applied to the values of the pixels. The coefficients of the matrix are multiplied to first probabilities and then added together; in order to reduce the data volume. The same applies to the second probabilities of the simulation maps. At the step of computing 106 the time related comparison weights; intermediate comparison weights are computed; and at step computing 112 the recurrence data, the intermediate weights are combined with the projected recurrence data Ti. As an option, the intermediate weights may correspond to the coherence weights.

The size of the sub images or the sliding window may be defined in relation with an event feature identified on the image. The step of defining 104 the plurality of geographical zones may comprise a sub step of defining 122 the size of geographical zones. The width and/or the height of the sub-image may be defined by means of, and/or correspond to, the maximum width of the observed event as represented by the image. The width and/or the height of the geographical zones and/or of the matrix may be defined by means of, and/or correspond to, the maximum width of the observed event as represented by the image. Accordingly, the step of defining 122 may be a step of calibration. A relevant dimension of the observed event may be extracted from the image, or reduced version of the image, or an expanded version of said image.

For instance, in the context of a flooding event, the length or the width, or more generally the main elongation of the sub-image or the geographical zones, may be proportional to the maximum width of a river, or of a lake apparent on the flooding image.

The process may comprise the step of selecting, amongst the simulation maps, the simulation map whose projected recurrence data Tj are the closest to the recurrence data $\hat{T}$ computed at step 112. At step displaying 116 the selected map, the map is displayed on a user terminal with a display screen.

The process may comprise a step of aligning 124 the first pixels and the second pixels of at least one of the simulation maps. Then, it is easier to combine the probabilities, and then to compare the values of the corresponding pixels.

The invention may essentially rely on an aerial image or a space image. Thus, it remains independent from ground measurement for assessing the observed event. Then, the invention offers relevant data event in zone with limited measuring equipment, and zones with complicated access, for instance due to a lack of transport infrastructures.

Features defined in relation with the geographical zones also apply to the intermediate images and; and vice-versa. Features defined in relation with the geographical zones also apply to the sub images and; and vice-versa. The sub steps are independent from each other, and are purely optional in the context of the invention.

A person with ordinary skills in the art will be enabled to provide a computer program for implementing the described methods by the description and figures that have been provided, relying solely on their general knowledge and without requiring inventive skill.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A computer-implemented method for obtaining measurement data indicative of an extent and recurrence of a predetermined natural event in a geographical area, the method comprising the steps of:

providing, in a first memory element, a first probability data set associated with a plurality of locations in said geographical area, indicating probabilities of each of the plurality of locations being affected by said predetermined event based on remote sensing data, comprising:

obtaining remote sensing data representing said geographical area;

using image processing means, detecting representations of said predetermined natural event in said remote sensing data; and associating a probability of detection of a representation of said predetermined natural event to the locations represented by said remote sensing data;

providing, in a second memory element, a plurality of second probability data sets associated with the plurality of locations, wherein each of the second probability data sets is further associated with a recurrence period or frequency of said predetermined natural event, and wherein each of the plurality of second probability data sets indicates probabilities of each of the plurality of locations being affected at a corresponding recurrence by said predetermined event based on computer simulation results;

using computing means, computing for each of said plurality of locations a set of weights, wherein each of the weights indicates a similarity between the probability associated with said location in the first probability data set, and in one of the second probability data sets, respectively;

using computing means, computing, for each of said locations and using the corresponding set of weights, a weighted combination of the probability data associated with the location in each of said second probability data sets, a weighted combination of the corresponding recurrence periods or frequencies, and storing results in a third memory element, thereby generating data indicative of the extent and recurrence of said predetermined natural event for each of the plurality of locations in said geographical area; and combining, using image processing means, the remote sensing data for each location in said geographical area with the generated data indicative of the extent and recurrence of said predetermined natural event for each location in said geographical area, to generate a map.

2. The computer-implemented method according to claim 1, wherein the predetermined natural event comprises a flooding event, and wherein the first and second probability data sets indicate probabilities that each of the plurality of locations is covered by water.

3. The computer-implemented method according to claim 1, wherein each of the plurality of locations is represented by one pixel of said remote sensing data.

4. The computer-implemented method according to claim 1, wherein at least one of the locations is represented by a sub-area comprising a plurality of pixels in said remote sensing data.

5. The computer-implemented method according to claim 4, wherein the first and second probability data sets indicate probabilities that each of the locations is covered by water, and wherein boundaries of at least one of the sub-areas are determined using image processing means by the detection of a watershed area in a dataset describing said geographical area.

6. The computer-implemented method according to claim 1, wherein the step of computing a set of weights for each of the locations comprises the computation of weights for sub-areas comprising a plurality of locations, wherein the weights computed for each location in the sub-area are aggregated into weights for the sub-areas.

7. The computer-implemented method according to claim 1, wherein the first and second probability data sets are characterized by the same spatial resolution.

8. The computer-implemented method according to claim 1, wherein said remote sensing data comprises synthetic aperture radar data.

9. The computer-implemented method according to claim 1, wherein the probabilities comprised in each of the second probability data sets are either 0 or 1.

10. The computer-implemented method according to claim 1, wherein said weighted combination is a weighted average.

11. The method according to claim 1, wherein said remote sensing data comprises an electro-optical image.

12. A non-transitory computer readable storage medium storing instructions that when executed by a computer, which includes a data processing means performs a method, the method comprising:

providing, in a first memory element, a first probability data set associated with a plurality of locations in said geographical area, indicating probabilities of each location being affected by said predetermined event based on remote sensing data, comprising:

obtaining remote sensing data representing said geographical area;

using image processing means, detecting representations of said predetermined natural event in said remote sensing data; and associating a probability of detection of a representation of said predetermined natural event to the locations represented by said remote sensing data;

providing, in a second memory element, a plurality of second probability data sets associated with the plurality of locations, wherein each of the second probability data sets is further associated with a recurrence period or frequency of said predetermined natural event, and wherein each of the plurality of second probability data sets indicates probabilities of each of the plurality of locations being affected at a corresponding recurrence by said predetermined event based on computer simulation results;

computing for each of said plurality of locations a set of weights, wherein each of the weights indicates a similarity between the probability associated with said location in the first probability data set, and in one of the second probability data sets, respectively;

computing, for each of said locations and using the corresponding set of weights, a weighted combination of the probability data associated with the location in each of said second probability data sets, a weighted combination of the corresponding recurrence periods or frequencies, and storing the results in a third memory element, thereby generating data indicative of the extent and recurrence of said predetermined natural event for each location in said geographical area; and combining, using image processing means, the remote sensing data for each location in said geographical area with the generated data indicative of the extent and recurrence of said predetermined natural event for each location in said geographical area, to generate a map.

* * * * *